United States Patent [19]

Williams

[11] Patent Number: 4,674,224
[45] Date of Patent: Jun. 23, 1987

[54] FISHING LURE

[76] Inventor: Robert Williams, 41 Cooks Rd., Denville, N.J. 07834

[21] Appl. No.: 850,600

[22] Filed: Apr. 11, 1986

[51] Int. Cl.⁴ .............................................. A01K 85/00
[52] U.S. Cl. .................................. 43/42.48; 43/42.06; 43/42.22
[58] Field of Search ................. 43/42.48, 42.45, 42.22, 43/42.06

[56] References Cited

U.S. PATENT DOCUMENTS

| | | | |
|---|---|---|---|
| 1,144,756 | 6/1915 | Damsma | 43/42.45 |
| 1,842,591 | 1/1932 | Dunkelberger | 43/42.22 |
| 2,055,841 | 9/1936 | Haislip | 43/42.48 |
| 2,482,309 | 9/1949 | Wilson | 43/42.22 |
| 2,686,381 | 8/1954 | Peterson | 43/42.09 |
| 2,788,604 | 4/1957 | Sleight | 43/42.06 |
| 2,861,380 | 11/1958 | Peterson | 43/42.22 |
| 2,875,549 | 3/1959 | O'Sullivan | 43/42.22 |

Primary Examiner—Gene P. Crosby
Attorney, Agent, or Firm—James M. Trygg

[57] ABSTRACT

A fishing lure is disclosed having the capability of being selectively operable between a plurality of different modes of operation. For example, the lure may be arranged to remain on the surface of the water while trolling or it may be arranged to dive below the surface. The body of the lure is of one piece unitary construction having a selectively positionable band or ring captive about its approximate midpoint. An angled deflecting surface is formed on the front of the lure and cooperates with the onrushing water and the weight of the hook which is attached to the movable ring to determine the mode of operation. By selectively moving the ring, and thereby the hook, to one position or another with respect to the deflecting surface, the lure will be made to remain on the surface of the water, dive below the surface, or move to one side or the other with respect to the path of travel of the trolling boat.

16 Claims, 14 Drawing Figures

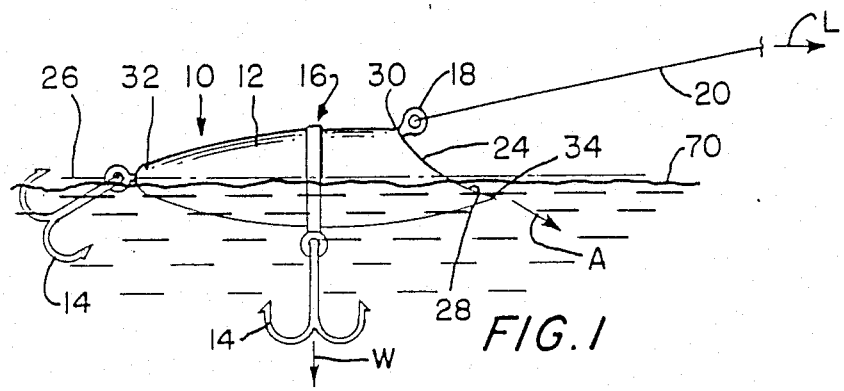
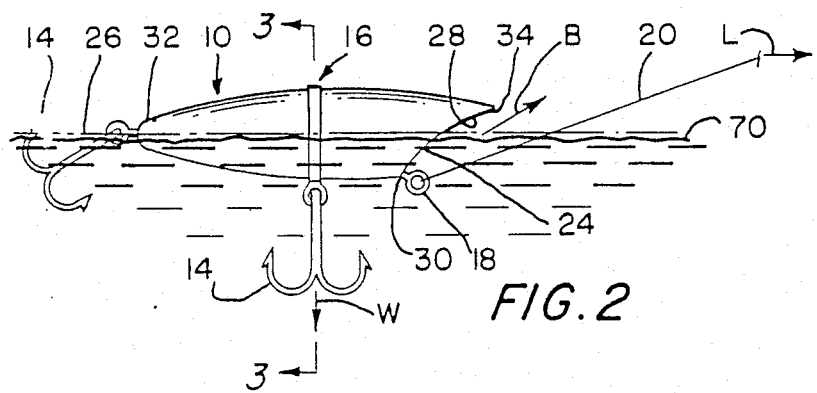
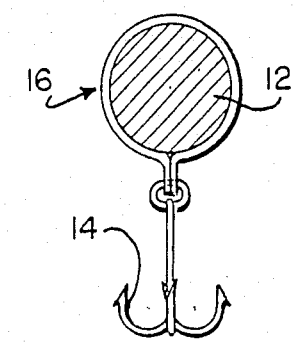
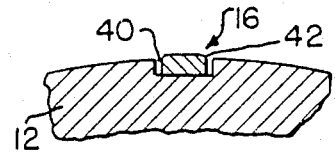
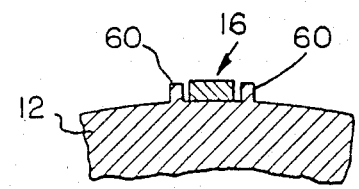
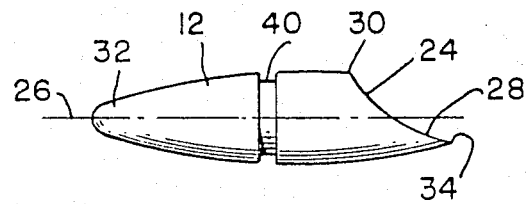
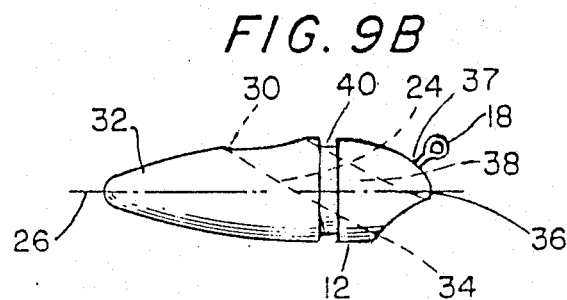
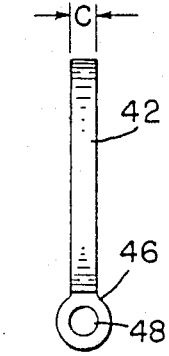
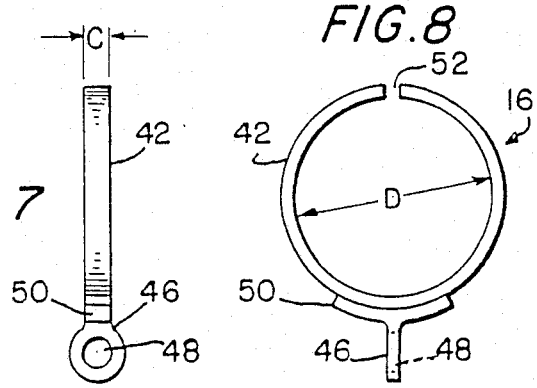

FISHING LURE

The present invention relates to fishing lures and more particularly to fishing lures which may be selectively manipulated to either operate on or near the surface of the water or to operate below the surface.

BACKGROUND OF THE INVENTION

Fishing lures having various mechanisms which may be manipulated to select one of two modes of operation are well known in the art. In one such mode of operation the lure will remain on or near the surface of the water when trolling and in the other mode of operation the lure will dive below the surface. Such fishing lures fall into two distinct catagories of structure. The first catagory of structure includes single piece construction of the body of the lure so that to effect one of the two modes of operation, the hook and fishing line must be attached to specific places on the body of the lure. With this type construction, when one wishes to change the mode of operation the fishing line and hook must be removed and reattached. An example of this type of fishing lure is disclosed in U.S. Pat. No. 2,788,604 which issued Apr. 16, 1957 to Sleight.

The other catagory of fishing lures includes lures having bodies that are composed of two or more parts which are held together by various combinations of springs, pins, washers, and screws or clips. Typical of this category of fishing lures is that disclosed in U.S. Pat. No. 2,482,309 which issued Sept. 20, 1949 to Wilson. Wilson discloses a fishing lure having a two part body wherein one part has an axially positioned pin rigidly attached thereto and projecting into a cavity that is axially formed in the other part. A spring is arranged within the cavity to urge the pin more deeply into the cavity. The end of the pin has a vertical slot which engages a vertically disposed rigid wire within the cavity. This arrangement of the slot and vertical wire keep the two pieces of the body in the desired alignment. The two pieces may be momentarily spread apart, against the action of the spring, and one part rotated 180 degrees with respect to the other, and the slot of the pin reseated with the vertical wire. Such structures add greatly to the cost of manufacture of the lure and detract from its reliability due to the complexity and number of interacting parts.

What is needed is a fishing lure that is capable of easily being switched between a plurality of modes of operation yet is simple and easily manufactured at relatively low cost.

BRIEF DESCRIPTIONS OF THE DRAWINGS

FIG. 1 is a side view of a fishing lure embodying the teachings of the present invention showing the lure in one mode of operation;

FIG. 2 is a view similar to that of FIG. 1 showing the lure in another mode of operation;

FIG. 3 is a cross sectional view taken along the lines 3—3 of FIG. 2;

FIGS. 4a and 4b are partial sectional views showing two embodiments of the area indicated by the arrow 16 in FIG. 1;

FIG. 5 is a side view of a moveable ring of the lure shown in FIG. 1;

FIG. 6 is a front view of the ring shown in FIG. 5;

FIG. 7 is a view similar to that of FIG. 5 showing another embodiment of the ring;

FIG. 8 is a front view of the ring shown in FIG. 7;

FIG. 9a is a side view of the body of the lure shown in FIG. 1;

FIG. 9b is a view similar to that of FIG. 9a showing another embodiment of the present invention;

SUMMARY OF THE INVENTION

Figure 10:
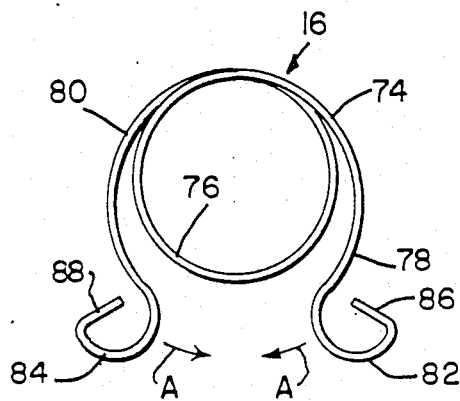
FIG. 10 is a view similar to that of FIG. 8 showing another embodiment of the ring.

According to the present invention there is shown a fishing lure having an elongated body of unitary construction, the body having a longitudinal axis. One end of the body has a deflecting surface associated therewith and a single connector for attaching a fishing line thereto. Control means is provided having a fish hook attached thereto for selectively positioning the hook in any of a plurality of positions with respect to the deflecting surface. The selectable positions are such that when the lure is caused to move through the water by the action of the fishing line on the single connector, the weight of the hook on the elongated body will cause the lure to: (i) remain on or near the surface of the water when the hook is in one of the plurality of positions; and (ii) dive substantially below the surface of the water when the hook is in another of the plurality of positions.

DESCRIPTION OF THE PREFERRED EMBODIMENT

There is shown in FIGS. 1, 2, and 3 a fishing lure 10 having an elongated body 12, a hook 14, and a band or ring 16 for attaching the hook 14 to the body. An eye fitting or connector 18 is included for attaching a fishing line 20 to the body 12. The body 12 is of one-piece unitary construction, as best seen in FIGS. 9a and 9b, and is made of wood, plastic, or other suitable material. A deflecting surface 24 arranged on one end of the body 12, as shown in FIGS. 1, 2, 9a, and 10, is angled with respect to the longitudinal axis 26 of the body 12. The deflecting surface 24 has a peripheral edge 28 where the surface 24 terminates at the side of the body 12. Because the deflecting surface 24 is angled with respect to the longitudinal axis 26, a portion 30 of the deflecting surface 24 is closer to the opposite end 32 of the body 12 than is another portion 34 of the deflecting surface 24. The eye fitting 18 is attached to the body 12 very near the portion 30 of the deflecting surface 24 that is closest to the end 32. The location of the eye fitting 18 with respect to the angled deflecting surface 24 affects the operation of the fishing lure 10 as will be described below.

A second embodiment of the body 12 is shown in FIG. 9b. In this embodiment, the body 12 includes a relatively short nose portion 36 which is forward of the deflecting surface 24. A through hole 38 is formed in the nose portion 36 and is angled with respect to the longitudinal axis 26 and intersects with the top surface of the body 12, as shown in FIG. 9b. In this embodiment, the most rearward inside surface of the hole 38 serves as the deflecting surface 24. Since the deflecting surface 24 is an inside surface of the hole 38, there is no peripheral edge 28 similar to that of the first embodiment shown in FIG. 9a. As with the first embodiment, a portion 30 of the deflecting surface 24 is closer to the opposite end 32 of the body 12 than is another portion 34 of the deflecting surface 24. In this embodiment, however, the eye fitting 18 is attached to the body 12 at a point 37 on the nose portion 36. It will be appreciated by those skilled in the art that the hole 38 may have a circular cross-sectional shape or may be somewhat elongated in cross section so that the deflecting surface 24 is somewhat flattened. In any case, this and similar structures are deemed to be equivalent in all respects to the embodiment shown in FIG. 9a.

The band or ring 16 is disposed within an annular groove 40 formed in the body 12 as shown in FIG. 4a. The groove 40, as best seen in FIGS. 9a and 9b, completely encircles the periphery of the body 12 forward of its approximate midpoint, that is, to the right of its midpoint. The ring 16 is sized so that it snuggly engages the groove 40 thereby permitting the ring to be manually rotated with respect to the body 12 to any desired position. There is sufficient fricton present between the ring and groove so that the ring will tend to remain in any such position selected. It will be appreciated by those skilled in the art that the groove 40 may be formed by a pair of annular raised ribs 60, shown in FIG. 4b, suitably arranged on the body 12. Such a structure is considered an obvious variation of the groove 40 formed in the body as shown in FIG. 9.

As shown in FIGS. 5 and 6, the band or ring 16 has a circular portion 42 and a pair of turned down tabs 44 which form a shank 46. The circular portion 42, in one embodiment shown in FIG. 4a, has a rectangular cross section having a width C, see FIG. 5, that is slightly smaller than the width of the groove 40. This permits free rotation of the ring 16 within the groove 40 without binding. The inside diameter D, see FIG. 6, of the circular portion 42, on the other hand, is slightly smaller than the diameter of the groove 40. The circular portion 42 is sufficiently resilient so that the diameter D may be momentarily increased by spreading apart the two tabs 44. With the two tabs 44 held apart, the ring 16 may be assembled to the body 12 by passing a porton of the body 12 through the expanded opening, diameter D, of the ring until the ring is positioned directly over the groove 40. The two tabs are then released permitting the circular portion 42 of the ring 16 to compress to its original free form state thereby snuggly engaging the diameter of the groove 40. This arrangement permits the selective positioning of the ring 16 with respect to the body 12 by manually grasping the shank 46 and rotating the circular portion 42 within the groove 40 to the desired position. It will be understood that while a pair of turned down tabs 44 is shown in FIG. 6, a single such tab will be sufficient provided that the circular portion 42 is discontinuous at some point around its circumferance, preferrable adjacent the tab 44, thus enabling the circular portion 42 to be expanded sufficiently for assembly to the body 12. A hole 48 is formed through both tabs 44 of the shank 46 for attaching the fish hook 14 in a manner that is well known in the art, see FIGS. 1, 2, and 3.

A variation of the structure of the band or ring 16 is shown in FIGS. 7 and 8. In this embodiment, the shank 46 projects downwardly, as viewed in FIG. 8, from an arcuate support 50 which is attached to the circular ring 42 by any suitable means such as bonding or riviting. Note, a discontinuity 52 in the circular ring 42 is provided thereby enabling the circular portion 42 to be expanded for assembly to the body 12 as described above.

Figure 11:
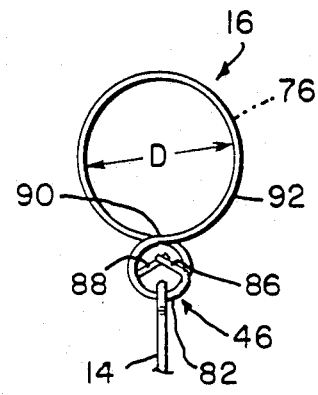
FIG. 11 is a plan view showing the ring of FIG. 10 in its assembled position.
Figure 12:
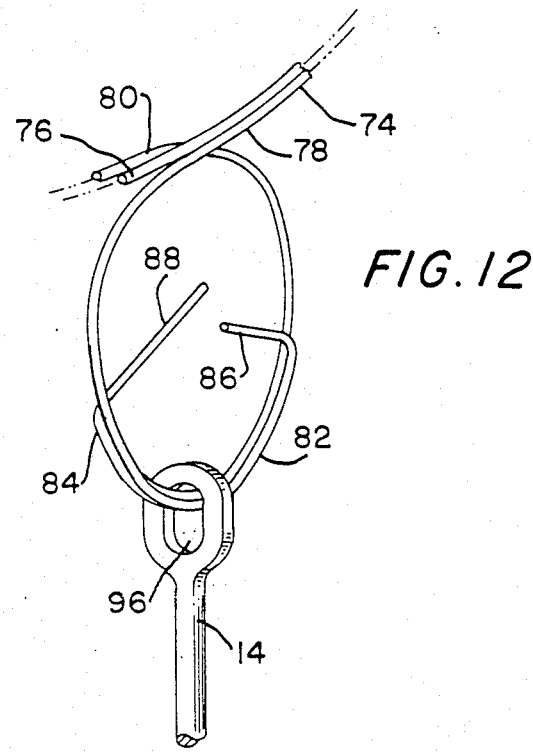
FIG. 12 is an isometric view of a portion of the ring enclosed with dashed lines in FIG. 11.

Another embodiment of the band or ring 16 is shown in FIGS. 10, 11, and 12. In this variation, the ring 16 is a single continuous formed wire 79 as best seen in FIG. 10. The wire 74 forms a closed first loop 76 and a partially open second loop comprising two arcuate legs 78 and 80 which continue from the first loop 76. Each leg 78 and 80 terminates in a circular or curved end 82 and 84 respectively, that curves in a direction opposite that of its associate arcuate leg. That is, the arcuate leg 78 has a center of radius which is to the left, as viewed in FIG. 10, while the curved end 82 has a center of radius which is to the right. Note that the arcuate leg 80 and associated curved end 84 are substantially mirror images of the arcuate leg 78 and curved end 82. Each curved end 82 and 84 terminates in an inwardly turned straight portion 86 and 88 which is directed somewhat toward the center of radius of its curved end. This variation of the ring 16 is shown in its free state in FIG. 10. It is formed so that the two curved ends 82 and 84 may be urged in a direction indicted by the arrows A in FIG. 10 against the inherent resiliency of the spring action of the wire 74 tending to hold the ring 16 in its free state, until the curved ends overlap as shown in FIGS. 11 and 12. While in this position, the two arcuate legs 78 and 80 substantially meet at the point 90 thereby forming a second closed loop 92 which is adjacent to and in registry with the first closed loop 76. The two closed loops 76 and 92 have an inside diameter D which is slightly smaller than the diameter of the groove 40, while the width of the groove is such that the two adjacent loops 76 and 92 may rotate within the groove 40 without binding on the sides. However, the diameter D of the loops 76 and 92, being sightly smaller than that of the groove 40, will cause sufficient resistance to rotation so that the ring 16 will remain in a selected position within the groove, as with the other embodiments of the ring 16 described above. This embodiment of the ring 16 is assembled to the body 12 by passing a portion of the body 12 through the loop 76 while the ring 16 is in its free state, as shown in FIG. 10. With the loop 76 encircling the groove 40, the two curved ends 82 and 84 are moved together until they overlap as shown in FIGS. 11 and 12. The hook 14 is then asembled to the ring 16 by first passing the straight portion 86 through one side of the opening 96 of the hook followed by the curved portion of the end 82. The two curved ends 82 and 84 are then manipulated until the straight portion 88 can be passed through the other side of the opening 96 of the hook 14. The hook 14 will then retain the two curved ends 82 and 84 captive within the opening 96, as best seen in FIG. 12. It is understod of course, that the spring-like action of the wire 74 will urge the two curved ends 82 and 84 somewhat apart, however, they will be retained in substantial alignment within the opening 96. The two curved ends 82 and 84 comprise the shank 46 of the ring 16 which is referred to below in the descripton of the operation of the device. This embodiment of the ring 16 may be varied so that the free state of the ring 16 is as shown in FIG. 11. This variation requires that the two curved ends 82 and 84 be urged outwardly in opposite directions so as to enlarge the diameter D somewhat when assembling to the body 12. This urging appart of the two ends 82 and 84 will be against the inherent resiliency of the spring action of the wire 74 tending to hold the ring 16 in its free state as shown in FIG. 11. While, in both of these variations of the ring 16, as shown in FIGS. 10, 11, and 12, two loops 78 and 92 are described, a single loop 92 without the loop 78 will function as well and is considered within the scope of the present invention.

In operation, the relative position of the hook 14 with respect to the angled face 24 determines the path that the lure 10 will take when trolling. When it is desired that the lure 10 dive below the surface of the water, the shank 46 of the ring 16 is rotated about the body 12 until the hook 14 is positioned on the same side of the body as the portion 34 of the deflecting surface 24 as shown in FIG. 1. The weight of the hook 14 will exert a force downwardly on the body 12, as indicated by W in FIG. 1, so that the deflecting surface 24 is positioned with the most forward portion 34 below the surface 70 of the water. As the fishing line 20 is caused to move in the direction indicted by L in FIG. 1, some of the onrushing water will be deflected upwardly along the deflecting surface 24 thereby causing the portion 34 of the deflecting surface 24 to tilt downwardly as viewed in FIG. 1. As the fishing line 20 continues to move in the direction L, the lure 10 will dive below the surface 70 of the water to a level of equilibrium where the downward forces of the water being deflected on the surface 24 are counterbalanced by the upward forces of the fishing line 20 which is attached to the eye fitting 38. It is important to the proper operation of the lure 10 that, in the case of the embodiment shown in FIG. 9a, the eye fitting 18 be positoned closely adjacent the most rearward portion 30 of the deflecting surface 24 thereby effecting a suitable balance between the deflecting forces of the water acting on the defecting surface 24, the force W of the weight of the hook 14, and the force of the fishing line 20 urging the lure 10 in the direction L. In the case of the embodiment shown in FIG. 9b, the eye fitting 18 should be positioned in the nose portion to effect a suitable balance of the above mentioned forces.

When it is desired that the lure 10 remain on or near the surface 70 of the water, the shank 46 of the ring 16 is rotated about the body 12 until the hook 14 is positioned on the same side of the body as the most rearward portion 30 of the deflecting surface 24, as shown in FIG. 2. The weight of the hook 14 will exert a force downwardly on the body 12, as indicated by W in FIG. 2, so that the deflecting surface 24 is positioned with the most forward portion 34 above the surface 70 of the water. As the fishing line 20 is caused to move in the direction indicated by L in FIG. 2, a portion of the onrushing water will be deflected downwardly along the deflecting surface 24 thereby causing the portion 34 to tilt upwardly and thereby remain above the surface 70 of the water. Additionally, the force of the fishing line 20 urging the lure 10 in the direction L in combination with the upward forces of the water being deflected on the surface 24 urges the lure 10 in a direction indicated by the arrow B in FIG. 2. This assures that the lure 10 will remain on or near the surface 70 of the water.

Upon reading the present disclosure, several variations in the structure of the band or ring 16 and the mating groove 40 will occur to those skilled in the art. All such structures are deemed to be within the spirit and scope of the present invention.

Since the shank 46 may be placed in any position about the periphery of the groove 40, variations of the above described actions may be obtained. For example, by selecting a shank position that is slightly to one side or the other of that shown in FIG. 2, the lure 10 will tend to ride on the surface 70 of the water to one side or the other of the path of the trolling boat. Similarly, the lure 10 may be made to follow such a displaced path under the surface 70 of the water by selecting a shank position slightly to one side of that shown in FIG. 1.

A very substantial advantage of the present invention is that the varied actions of the lure 10, as described above, are obtainable by the simple operation of rotating the ring 16 about the periphery of the body 12 until the hook 14 is in the desired position relative to the deflecting surface. The fishing line 20 need not be reattached nor are there any other parts or mechanisms to be manipulated. A further substantial advantage is the mechanical simplicity of the lure 10. There are only two moving parts, the body 12 and the ring 16 with attached hook. The body 12 is of one piece unitary construction which can be easily manufactured by standard techniques at relatively low cost. Additionally, the simple structure of the present invention results in a more reliable and durable fishing lure that will withstand the somewhat abusive environment of the tackle box and obstacles normally encountered in lakes and streams.

I claim:
1. A fishing lure comprising:
   (a) an elongated body of unitary construction having a longitudinal axis;
   (b) a single connector for attaching a fishing line to one end of said body;
   (c) a deflecting surface associated with said one end of said body; and
   (d) control means having a fish hook attached thereto for selectively positioning said hook in any of a plurality of positions with respect to said deflecting surface so that when said lure is caused to move through the water by the action of said fishing line on said single connector the weight of said hook on said elongated body will position said deflecting surface with respect to said water so that said deflecting surface deflects said water causing the lure to;
     (i) remain on or near the surface of the water when said hook is in one of said plurality of positions; and
     (ii) dive substantially below the surface of the water when said hook is in another of said plurality of positions.
2. The fishing lure as set forth in claim 1 wherein said control means includes;
   a ring which encircles a portion of said elongated body and having a fish hook attached thereto, said ring being selectively movable about said portion of said body so that said hook may occupy any of said plurality of positions.
3. The fishing lure as set forth in claim 2 wherein said ring is in pressing contact with said portion of said body so that said hook will remain in a preselected first position until selectively moved to a second position.
4. The fishing lure as set forth in claim 3 wherein said portion of said body includes an annular groove formed about the periphery thereof and said ring is disposed within said groove.
5. The fishing lure as set forth in claim 4 wherein said body has another end opposite said one end and wherein said deflecting surface is angled with respect to said longitudinal axis so that a first portion of said deflecting surface is closer to said another end than a second portion of said deflecting surface.
6. The fishing lure as set forth in claim 5 wherein said ring is a continuous ring.

7. The fishing lure as set forth in claim 5 wherein said ring includes means for attaching a fishing hook thereto.

8. The fishing lure as set forth in claim 7 wherein said single connector for attaching a fishing line is adjacent said first portion of said deflecting surface.

9. A fishing lure comprising:
(a) an elongated body of unitary construction having a longitudinal axis, said body including a nose portion;
(b) a single connector for attaching a fishing line to said body;
(c) a deflecting surface comprising an inside surface of a hole disposed through said nose portion; and
(d) control means having a fish hook attached thereto for selectively positioning said hook in any of a plurality of positions with respect to said deflecting surface so that when said lure is causes to move through the water by the action of said fishing line on said single connector the weight of said hook on said elongated body will position said deflecting surface with respect to said water so that said deflecting surface deflects said water causing the lure to;
   (i) remain on or near the surface of the water when said hook is in one of said plurality of positions; and
   (ii) dive substantially below the surface of the water when said hook is in another of said plurality of positions.

10. The fishing lure as set forth in claim 9 wherein said single connector for attaching a fishing line is attached to said nose portion.

11. The fishing lure as set forth in claim 10 wherein said control means includes;
   a ring which encircles a portion of said elongated body and having a fish hook attached thereto, said ring being selectively movable about said portion of said body so that said hook may occupy any of said plurality of positions.

12. The fishing lure as set forth in claim 11 wherein said ring is in pressing contact with said portion of said body so that said hook will remain in a preselected first position until selectively moved to a second position.

13. The fishing lure as set forth in claim 12 wherein said portion of said body includes an annular groove formed about the periphery thereof and said ring is disposed within said groove.

14. The fishing lure as set forth in claim 13 wherein said body has an end opposite said nose portion and wherein said deflecting surface is angled with respect to said longitudinal axis so that a first portion of said deflecting surface is closer to said end than a second portion of said deflecting surface.

15. The fishing lure as set forth in claim 14 wherein said ring is a continuous ring.

16. The fishing lure as set forth in claim 15 wherein said ring includes means for attaching a fishing hook thereto.

* * * * *